May 3, 1927.  
B. F. SCHMIDT  
GEAR SHIFT  
Filed April 24, 1925  
1,626,975  
6 Sheets-Sheet 1

May 3, 1927.
B. F. SCHMIDT
GEAR SHIFT
Filed April 24, 1925    6 Sheets-Sheet 5
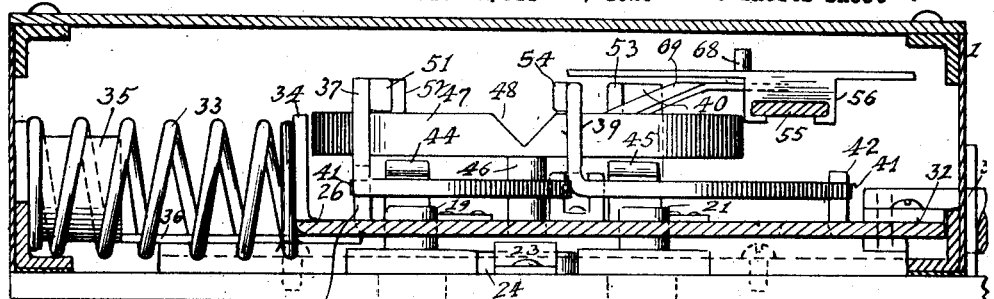
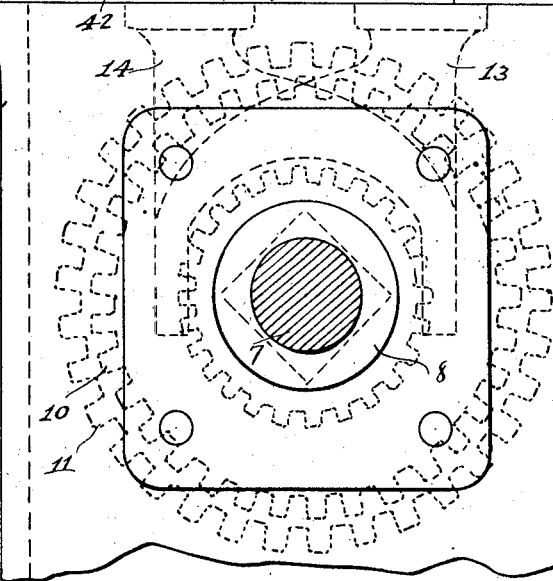
Fig. 5.  Fig. 6.
Fig. 7.
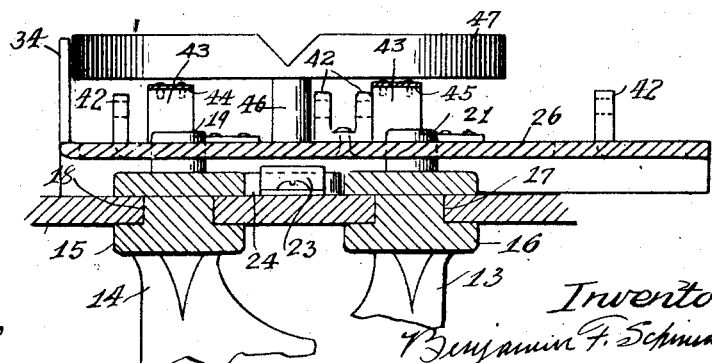

May 3, 1927.
B. F. SCHMIDT
GEAR SHIFT
Filed April 24, 1925      6 Sheets-Sheet 6
1,626,975
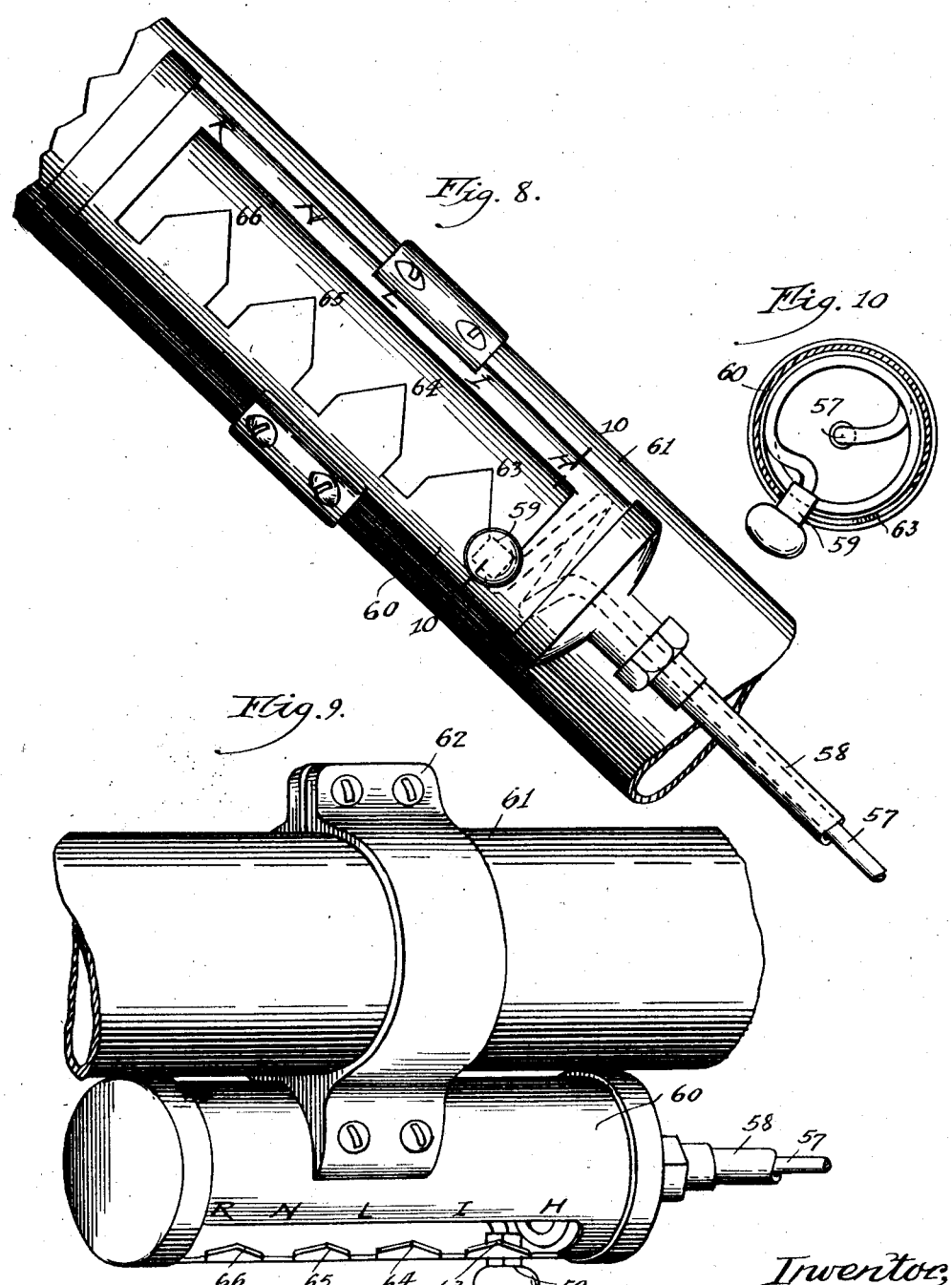

Patented May 3, 1927.

1,626,975

UNITED STATES PATENT OFFICE.

BENJAMIN F. SCHMIDT, OF LOS ANGELES, CALIFORNIA.

GEAR SHIFT.

Application filed April 24, 1925. Serial No. 25,714.

My invention relates to improvements in gear shifts and refers more particularly to a gear shift mechanism adapted for use on vehicles using a selective type transmission. Among the salient objects are to provide a gear shift mechanism by means of which the gear change is automatically effected with the actuation of the clutch pedal, the desired gear speed having been selected by the movement of a small lever mounted upon the steering post; to provide a gear shift mechanism which eliminates the necessity of a centrally positioned gear shift lever in the floor board of the driver's seat and one that permits of a preselection of any desired speed at any time prior to the actual shift; to provide a shift mechanism that is quiet of operation and positive in the engagement of the meshing gears; to provide a mechanism which effects the gear change with the releasing of the clutch pedal or at a time just prior to the engagement of the clutch.

In the drawings:

Fig. 5 is a front end view showing the interior of the gear shift mechanism and part of the transmission mechanism.

Fig. 6 is a fragmentary detail showing the sliding engagement of the lateral shifter plate flanges.

Fig. 7 is a detail view showing more particularly the selector disc and shifter wedge springs.

Fig. 8 is a detail view of the shifting hand lever attachment for the steering post.

Fig. 9 is a view of the hand lever attachment shown in Fig. 8 showing particularly the method of attaching same to the steering post.

Fig. 10 is a cross section of the hand lever tube shown in Figs. 8 and 9.

Figure 1:
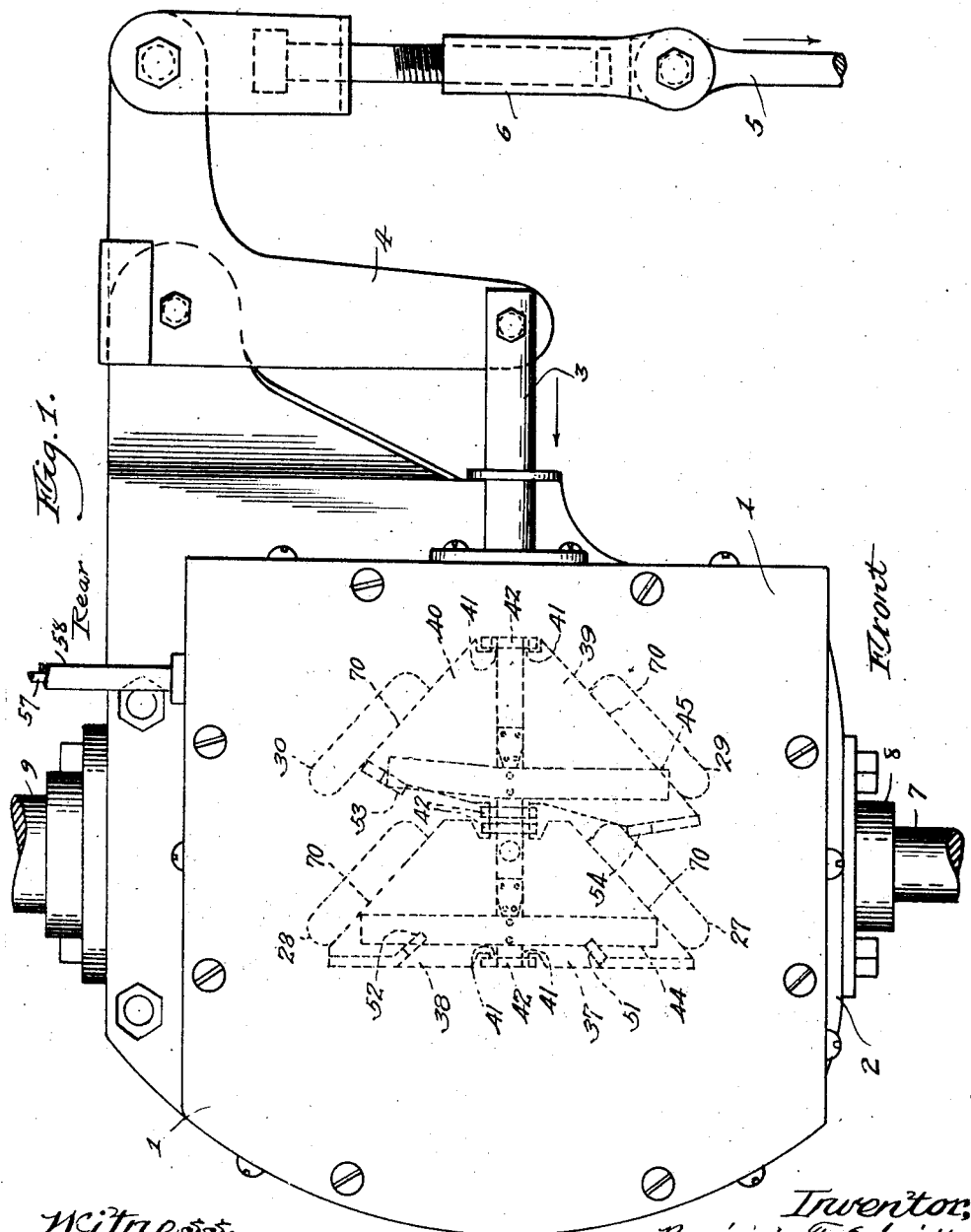
Fig. 1 is a plan view of the casing for the gear shift mechanism showing the clutch connection.

This gear shift mechanism is adapted to be mounted upon any selective type of transmission mechanism and being directly connected to the clutch pedal is operable to effect the gear change with the actuation of the clutch.

Referring to the drawings, the gear shift casing 1 is mounted on top of the transmission case 2 and is connected to the clutch pedal (not shown) by means of the shaft 3, yoke 4 and connecting link 5 which is connected to the yoke by means of turn buckle arrangement 6. The purpose of this turnbuckle arrangement is to provide an adjustable link through which the operation of the gear shift mechanism may be timed relative to the engagement and disengagement of the clutch. It is essential that the clutch be disengaged before the gears are shifted to avoid objectionable gear clash. The direction of the pull of the rod 5 which is transmitted to the shaft 3 through the yoke 4 is shown by the arrows.

Figure 2:
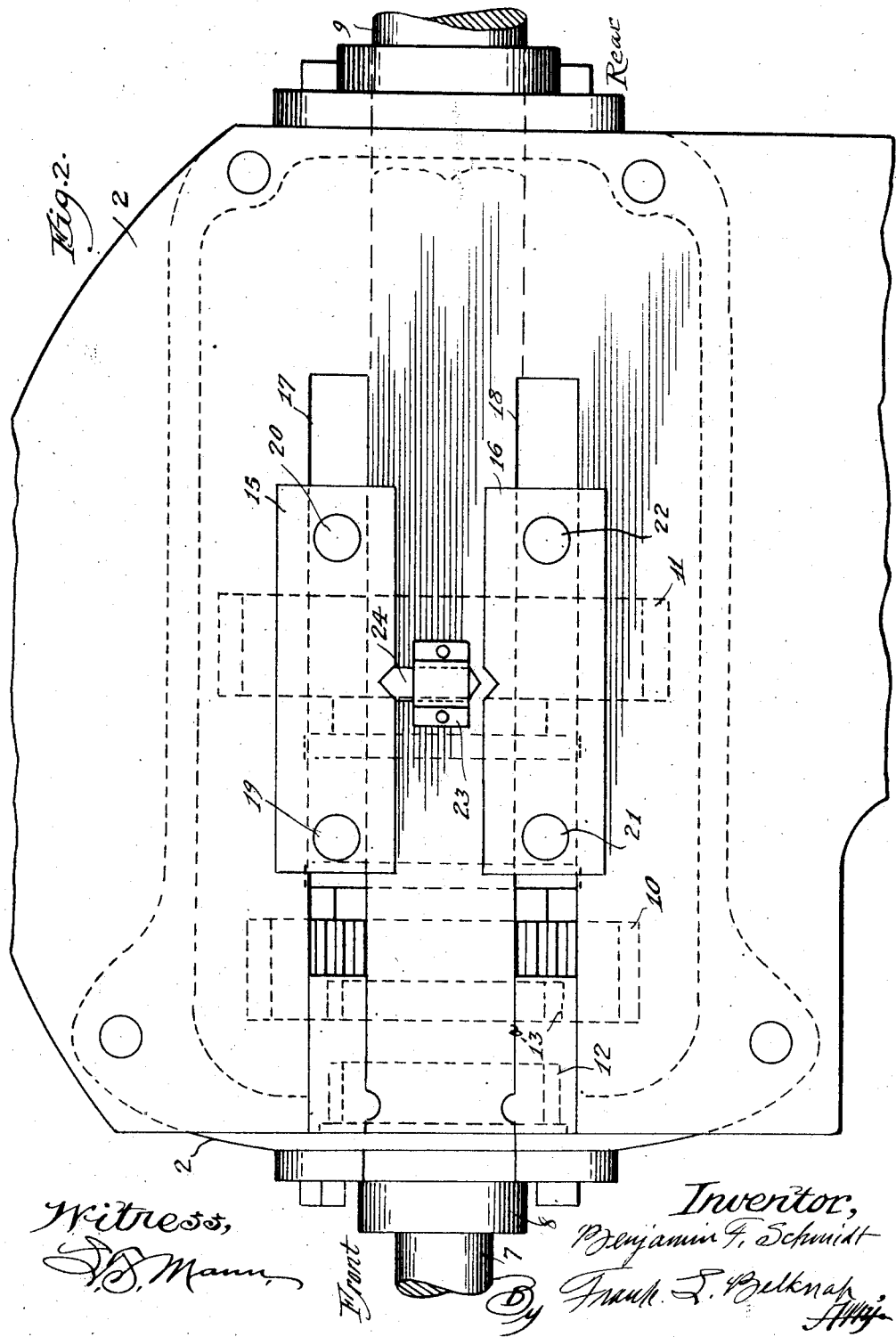
Fig. 2 is a plan view of the top of the transmission casing.

In Fig. 2 are shown only those parts of the transmission mechanism which are essential to the understanding of the present invention. A shaft 7 bearing in the transmission casing at 8 drives through a series of gears, the propeller shaft 9 bearing in the rear of the casing. Within the casing are two slidably mounted gears 10 and 11. The gear 10 drives propeller shaft 9 in intermediate and high gear and gear 11 drives propeller shaft in low and reverse. It will be understood that there are a series of gears in the transmission casing which mesh with these sliding gears in order to effect the proper speeds on the propeller shaft. These gears have been omitted in the drawing. When in high speed, the gear 10 is moved forward to a position where the pinion 12 meshes with the internal gear 13ª of the gear 10. The movement of the two slidable gears 10 and 11 is effected by means of the shifter forks 13 and 14. The fork 13 controlling the movement of the gear 11 and the fork 14 controlling the gear 10. Flanged lugs 15 and 16 constructed as part of the shifter forks are slidably mounted in the slots 17 and 18 cut in the top plate of the transmission case. Vertical posts 19 and 20 are mounted on the flanged lug 15 and similar posts 21 and 22 are mounted on the flanged member 16. On the top plate of the transmission casing is riveted, a staple plate 23 in which is slidably held an interlock 24. This interlocking member is adapted to slide back and forth engaging V-shaped cut out portions in the respective flanged lugs of the shifter forks and thereby locking either of the shifter forks while the other is being shifted.

Figure 3:
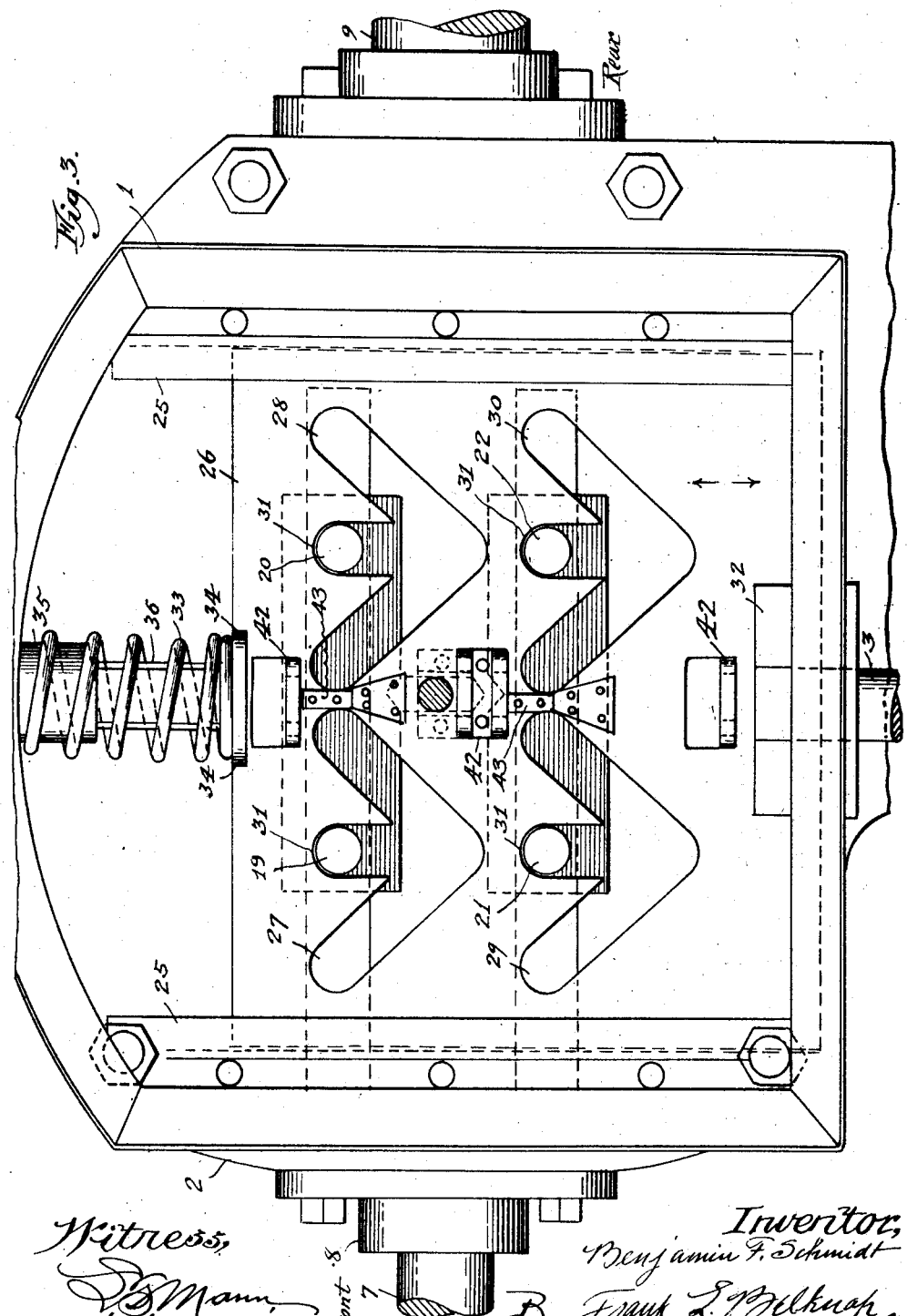
Fig. 3 is an interior plan view of the gear shift mechanism showing particularly the details of the shifter plate.

In the bottom of the gear shift casing held in place by two lateral guides 25 is a shifter plate 26. This plate has four slotted designs cut therein wedge shaped having a central slot between either of the lateral extending legs. The vertical posts 19, 20, 21 and 22 extend up through the slotted designs 27, 28, 29 and 30. These vertical posts are adapted to slide into the various legs of the respective design slots. In Fig. 3 the sliding gears are shown in neutral position at which time the vertical posts rest in the central slots 31 of the respective wedges. The vertical post 19 controls low speed, the vertical post 20 controls the reverse, 21 controls the high speed and 22 the intermediate of the gear shift transmission. The shifter plate is adapted to be moved from side to side in the direction shown by the arrows, by the actuation of the clutch pedal as it is fixedly connected to the shaft 3 by means of the rigid plate 32. A stiff compression coil spring 33 abuts the opposite side of the shifter plate at 34 and returns the shifter plate to its initial position after being moved against the spring compression to effect the gear change. The spring is held in place on the casing by means of a stub shaft 35 and guide member 36. This spring acts in conjunction with and assists the clutch spring in returning the shifter plate to a position shown in Fig. 3.

Figure 4:
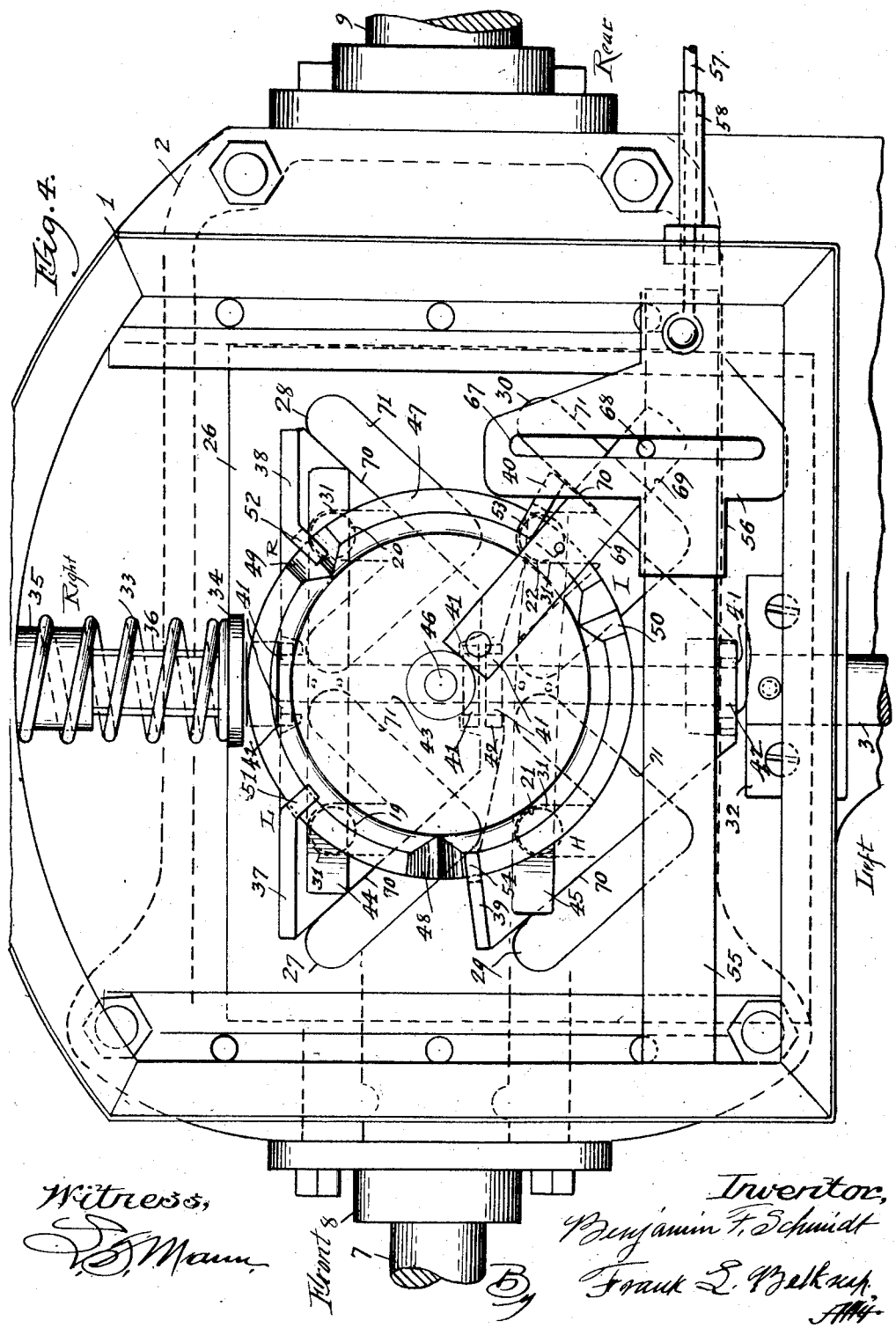
Fig. 4 is an interior plan view of the gear shift mechanism showing all the parts in place.

Directly above the shifter plate and on a line running centrally of the shifter plate are pivoted four wedges 37, 38, 39 and 40 shown in Fig. 4, and in dotted lines in Fig. 1. These wedges are partially cut away at the ends to form tongues 41 which engage in apertures in ears 42 punched upwardly from the plate 26, to pivot the wedges along the central line of the shifter plate. Central lugs 43 running transversely of the shifter plate and riveted thereto are positioned between the ends of the slotted designs shown in Fig. 3. Riveted to these central lugs 43 are two flat springs 44 and 45. These springs keep a constant downward tension upon the outer extremities of the wedges. Above the wedges and positioned centrally at 46 of the shifter plate is selector disc 47. On the upper surface and around the edge of the disc is formed a shoulder which is notched as shown at 48, 49 and 50. The wedges 37, 38, 39 and 40 are up-turned at their ends and each has a projecting nose 51, 52, 53 and 54 respectively. These projecting members extend over the rim of the disc and are adapted to register with the notches therein with the rotation of the disc. The disc is caused to rotate as follows: across the interior of the left side of the gear shift casing extends a guide bar 55 upon which is slidably mounted a head block 56. To this head block is connected a stiff wire 57 which extends through a tube 58 to a lever handle 59 mounted in a tube 60 which is fixed to the steering post 61 by the clamps 62. The tube 60 mounted upon the steering post has a series of cut-out portions or notches 63, 64, 65 and 66 corresponding to high, intermediate, low and reverse respectively. By raising the handle 59 and inserting it in any of the notches, a connecting wire 57 is likewise moved forward or backward in the casing, sliding the head block upon its guide bar 55. This head block is slotted at 67 permitting the pin 68 which is mounted upon the arm 69 to slide within this slot and transmit a rotary movement to the arm 69 about the pivot 46 as this arm is fixedly mounted upon the selector disc. The positioning of the head block in the different positions by means of a hand lever 59 rotates the selector disc to positions corresponding to the respective speeds. That is, when the notch 49 is in a position to register with the projecting nose 52 of the wedge 38 and the clutch pedal is actuated, the mechanism will affect a gear change to bring into operation the gears in the transmission casing which produce reverse speed. By moving the head block to a position where the member 51 is directly over the notch 48, that is in a position to drop into the notch, the actuation of the clutch will move the gears to engagement of first speed. With the disengagement of this notch and movement of the head block by means of hand lever 59 to a position of intermediate speed, the member 53 will be in a position to drop into the notch 49. High speed is produced by rotating the disc to a position where the notch 50 is in a position to register with the projecting lug or nose 54.

The actual shifting of the gears is produced in the following manner: having selected, for example, reverse speed by means of the hand lever 59 the head block through the connecting arm 69 has positioned the disc as shown in Fig. 4. Now, with the actuation of the clutch pedal, the shifter plate is moved against the tension of the spring 33 which causes the vertical posts 19, 20, 21 and 22 to slide forward to the apices of the slotted wedge designs in the shifter plate. In this position, the vertical post 20 will pass over the outer edge 70 of the wedge 38 and due to the fact that the projecting lug 52 is in registration with the notch 49 the wedge will drop onto the shifter plate caused by the downward pressure of the flat spring 44.

It will be noted also that each of the other vertical posts will pass under the outer or diagonal edges 70 of their respective wedges but in each case the wedges are prevented from being forced down onto the shifter plate by the flat springs, due to the fact that the lugs 51, 53, and 54 extending over the edge of the selector disc are not in registration with one of the notches. As the clutch is released, the edge 70 of the wedge 38 will direct the vertical post 20 down the lateral slot 71. The vertical post 19 will likewise follow the corresponding slot 71 in the adjoining slotted design. The posts 21 and 22 which direct the other shifter fork, will remain in the central slot and will be held in place by the interlock previously explained. The directing of this vertical post down the lateral slot 71 by the diagonal edge 70 of the wedge 38 will move the slidable gear 11 to a position where it meshes with the transmission gears to produce the reverse speed in the transmission.

With each speed gear change, when the disc is rotated to a position where a notch of the disc registers with an upstanding hook or lug of one of the wedges, the wedge selected will snap into the notch of the disc by reason of the flat spring pressure and the edge of the wedge will direct the vertical post which controls one of the speed gears into a lateral leg of the slotted design, thus effecting the selected gear change when the shifter plate returns from its moved position with the engagement of the clutch. That is, when lug 51 registers with the notch 48, the change to first speed may be made. When the lug 53 registers with the notch 49, second speed may be affected and when the lug 54 registers with the notch 50, the change may be made to high speed.

A neutral position may be selected half way between reverse and low in which position the projecting lugs 51, 52, 53, and 54 are all in positions out of registry with any of the notches. It is obvious that at this time, although the clutch may be actuated, the wedges will be held in a raised position and the posts will pass freely beneath them back and forth in central slots of each of the design slots in the shifter plate.

I claim as my invention:

1. In a gear shift mechanism, the combination with shifter forks having upstanding members, a clutch, of a slidably mounted shifter plate engaging said upstanding members, operatively connected with the clutch, a selector disc rotatably positioned on said plate, and having operable connections from the driver's seat for rotating it at selected positions corresponding to the gear changes, means operable at the selected positions of the disc to function with the clutch operation and effect the selected speed gear changes.

2. In a gear shift mechanism the combination with shifter forks of a slidable shifter plate, engaged thereby and having notches therein, a notched selector disc rotatably mounted on said shifter plate, means operable from the driver's seat for rotating said disc to positions corresponding to the different gear changes, pivoted director means adapted to register with different notches of the selector disc in predetermined positions, locking the same and cooperating with the slotted apertures in the shifter plate to direct the movement of the respective shifter forks with the operation of the clutch pedal to effect the desired gear change.

3. In a gear shift mechanism, the combination of: a shifter plate connected to and actuated with a clutch pedal and having a variable cam engagement with shifter fork members to translate them to different gear changing positions; a rotatable selector disc functioning with the shifter plate and operable from the driver's seat for selecting the desired gear change, said disc having notched portions; director wedges on the shifter plate adapted to engage said selected notches and selectively functioning to determine the nature of said cam engagement necessary to effect the selected gear change upon actuation of the clutch pedal.

4. In a gear shift mechanism, the combination of: a shifter plate connected to and actuated with the clutch pedal and having a variable cam engagement with shifter fork members to translate them to different gear changing positions; director means cooperating with said plate and operable to determine the nature of said cam engagement; means operable from the driver's seat to select the gear change to be effected and to selectively operate said director means, whereby a proper cam engagement will be insured to effect the selected gear change; and a spring exerting its tension to normalize said plate and the clutch pedal, whereby said spring will be tensioned during positive operation of the clutch pedal and will automatically translate the plate in a gear changing operation upon release of the clutch pedal.

5. In a gear shift mechanism, the combination of: a shifter fork member; a slidable shifter plate connected to and actuated with the clutch pedal, said fork member engaging within an aperture in said plate formed to provide a neutral notch and two oppositely diverging notches corresponding with opposite gear shifting movements of said fork member; director means associated with said notches and operable to selectively cause said fork member to engage in one or the other of the diverging notches upon actuation of said plate to effect the desired gear change; and selector means operable from the driver's seat to selectively operate said director means for determining the gear change to be effected.

BENJAMIN F. SCHMIDT.